(12) United States Patent
Gudmundsson

(10) Patent No.: US 7,574,192 B2
(45) Date of Patent: Aug. 11, 2009

(54) METHOD FOR OPERATING A COMMUNICATION SYSTEM AND OBJECTS FOR SUCH A SYSTEM

(75) Inventor: Stefan Gudmundsson, Gothenburg (SE)

(73) Assignee: Volvo Technology Corporation, Gothenburg (SE)

( * ) Notice: Subject to any disclaimer, the term of this patent is extended or adjusted under 35 U.S.C. 154(b) by 819 days.

(21) Appl. No.: 10/248,903

(22) Filed: Feb. 28, 2003

(65) Prior Publication Data
US 2003/0112124 A1 Jun. 19, 2003

Related U.S. Application Data

(63) Continuation of application No. PCT/SE01/01793, filed on Aug. 22, 2001, now abandoned.

(30) Foreign Application Priority Data
Aug. 29, 2000 (SE) .................................. 0003046

(51) Int. Cl.
H04B 1/16 (2006.01)
(52) U.S. Cl. .................. 455/343.4; 455/127.5; 455/574; 340/7.38; 713/323
(58) Field of Classification Search .............. 455/127.1, 455/127.5, 343.1, 343.2, 343.4, 572, 574; 340/7.32, 7.33, 7.34, 7.35, 7.36, 7.37, 7.38; 713/320, 323
See application file for complete search history.

(56) References Cited

U.S. PATENT DOCUMENTS

| | | | |
|---|---|---|---|
| 5,251,325 A | 10/1993 | Davis et al. ................. 455/38.3 |
| 5,392,457 A | 2/1995 | Davis et al. ................. 455/38.3 |
| 6,088,576 A | 7/2000 | Sone .......................... 455/38.3 |
| 6,112,055 A * | 8/2000 | Bennett et al. ............. 340/7.34 |
| 6,144,865 A * | 11/2000 | Pichard ....................... 455/574 |
| 6,236,850 B1 * | 5/2001 | Desai ....................... 455/343.2 |
| 6,330,234 B1 * | 12/2001 | Tomasi et al. ............... 370/342 |
| 6,480,476 B1 * | 11/2002 | Willars ....................... 370/311 |
| 6,501,969 B1 * | 12/2002 | Cannon et al. ............. 455/574 |
| 6,597,929 B1 * | 7/2003 | Han et al. ................... 455/574 |
| 6,819,661 B2 * | 11/2004 | Okajima et al. ............. 370/347 |
| 7,020,102 B2 * | 3/2006 | Tuomainen et al. ......... 370/311 |
| 7,277,737 B1 * | 10/2007 | Vollmer et al. .............. 455/574 |

FOREIGN PATENT DOCUMENTS

| EP | 0319219 A2 | 6/1989 |
|---|---|---|
| WO | 02/19745 A1 | 3/2002 |

OTHER PUBLICATIONS

International Search Report dated Nov. 30, 2001.

* cited by examiner

*Primary Examiner*—Nhan T Le
(74) *Attorney, Agent, or Firm*—Novak Druce + Quigg LLP

(57) ABSTRACT

Method and arrangement for operating a communication system for communication between a central station (10) and one or a plurality or remote objects (20 to 25), as well as such an object, wherein at least one object is operated in a battery saving mode in which it is switched alternatively between a wake period for conducting communication between the object and the central station and a sleep period in which communication is inactive. Each object is designated a predetermined first time ($t_0$) and a time interval (Dt), wherein each object initiates the wake periods at times $t_0+n$ (Dt) with n=0, 1, 2, . . . and wherein the time interval is longer than the wake period.

21 Claims, 2 Drawing Sheets

METHOD FOR OPERATING A COMMUNICATION SYSTEM AND OBJECTS FOR SUCH A SYSTEM

CROSS REFERENCE TO RELATED APPLICATIONS

This application is a continuation patent application of International Application No. PCT/SE01/01793 filed 22 Aug. 2001 which was published in English pursuant to Article 21(2) of the Patent Cooperation Treaty and which claims priority to Swedish Patent Application No. 0003046-0 filed 29 Aug. 2000. Both applications are expressly incorporated herein by reference in their entireties.

BACKGROUND OF INVENTION

1. Field of the Invention

The invention relates to a method for operating a communication system for communication between a central station like a service center and one or a plurality of remote objects like vehicles, trucks, airplanes, and plants, houses and/or other such facilities that include a battery-based electric power supply. The invention further relates to a computer program for conducting this method, as well as for affecting the objectives of the disclosed invention(s).

2. Background of the Invention

Remote objects are usually equipped with an independent power supply that comprises (includes) a battery and an electric generator for supplying on board electric and electronic devices and other electrical equipment with electric energy. The generator is driven by a motor when the object is operated. In periods when the object is out of operation, however, many devices nevertheless have to be active or at least in a sleep mode. For such periods, the battery is provided for supplying these devices with the necessary electric energy. From time to time the battery has to be re-charged by means of the electric generator according to the amount of energy consumed therefrom.

A common problem with such a battery power supply resides in the risk that a discharge of the battery may impair the operation, readiness and/or safety of the object, if the object as well as the electric generator are not operated for a longer time. For avoiding this risk, it is known to monitor the battery output-power and to give an alarm if the battery is going to be discharged so that appropriate actions for re-charging the battery (e.g. starting the motor so that the electric generator can re-charge the battery) can be taken. However, in case of remote objects with no personnel or staff, or in the case of a vehicle that is parked in a remote area for a longer time, it is often difficult or expensive to handle such a situation. This problem is especially serious if a communication system on board the object is used, for example, for monitoring, controlling or locking/unlocking the object and it functions via a central station and which has to be in an active mode permanently for communicating with the central station.

U.S. Pat. Nos. 5,251,325 and 5,392,457 disclose a battery saving method and apparatus for selectively supplying power to each receiver function of a battery powered communication receiver at predetermined time intervals for enabling the reception of coded message signals with each receiver function being powered only as long as is required for each receiver function to stabilize prior to the reception of said coded message signals.

EP 0319219 discloses a paging apparatus with a battery saving function wherein a power supply control means is provided for periodically switching on a receiving means for a predetermined period in response to the detecting of synchronization signals and in the absence of a predetermined signal sequence, and for switching off the same when the predetermined signal sequence is detected and immediately after reception of a paging signal for the apparatus.

However, in case of a communication system comprising a central station like a service center and a plurality of remote objects, a random switching of such objects between on- and off-status, or between wake and sleep modes or periods can cause problems with respect to availability of the objects, as well as with respect to the network load if at one time too many objects are simultaneously in a sleep or wake period.

SUMMARY OF INVENTION

It is a primary objective of the invention to provide a method for operating a communication system for communication between a central station, like a service center, and a plurality of remote objects in a battery saving mode in such a way that availability of the objects is improved and the load of the communication network is decreased.

Further, it is an objective of the invention to solve the above problem of limited operability of electric and electronic devices at remote objects which are equipped with a battery-based power supply and which are not operated for a longer time.

Further, it is an objective of the invention to provide a method for operating a communication system that allows an extension of time duration which is available for communication between a central-station-like service center and one or a plurality of such objects, before a related battery supplying the object has to be re-charged.

Further, it is an objective of the invention to provide an object (apparatus, means) upon which the above method(s) may be applied.

By designating each object a predetermined first time $t_0$ and a predetermined time interval $D_t$, for initiating the wake periods at times $t_0+n$ ($D_t$), the wake periods can equally be distributed among the objects so that there is no overload of the communication network. Further, such designated first time $t_0$ and time interval $D_t$ can be stored for each object at the central station, so that it is known at the central station, when an object is active for conducting communication.

BRIEF DESCRIPTION OF DRAWINGS

Further details, features and advantages become apparent from the following description of preferred embodiments of the invention with reference to the drawings that show the following.

DETAILED DESCRIPTION

Figure 1:
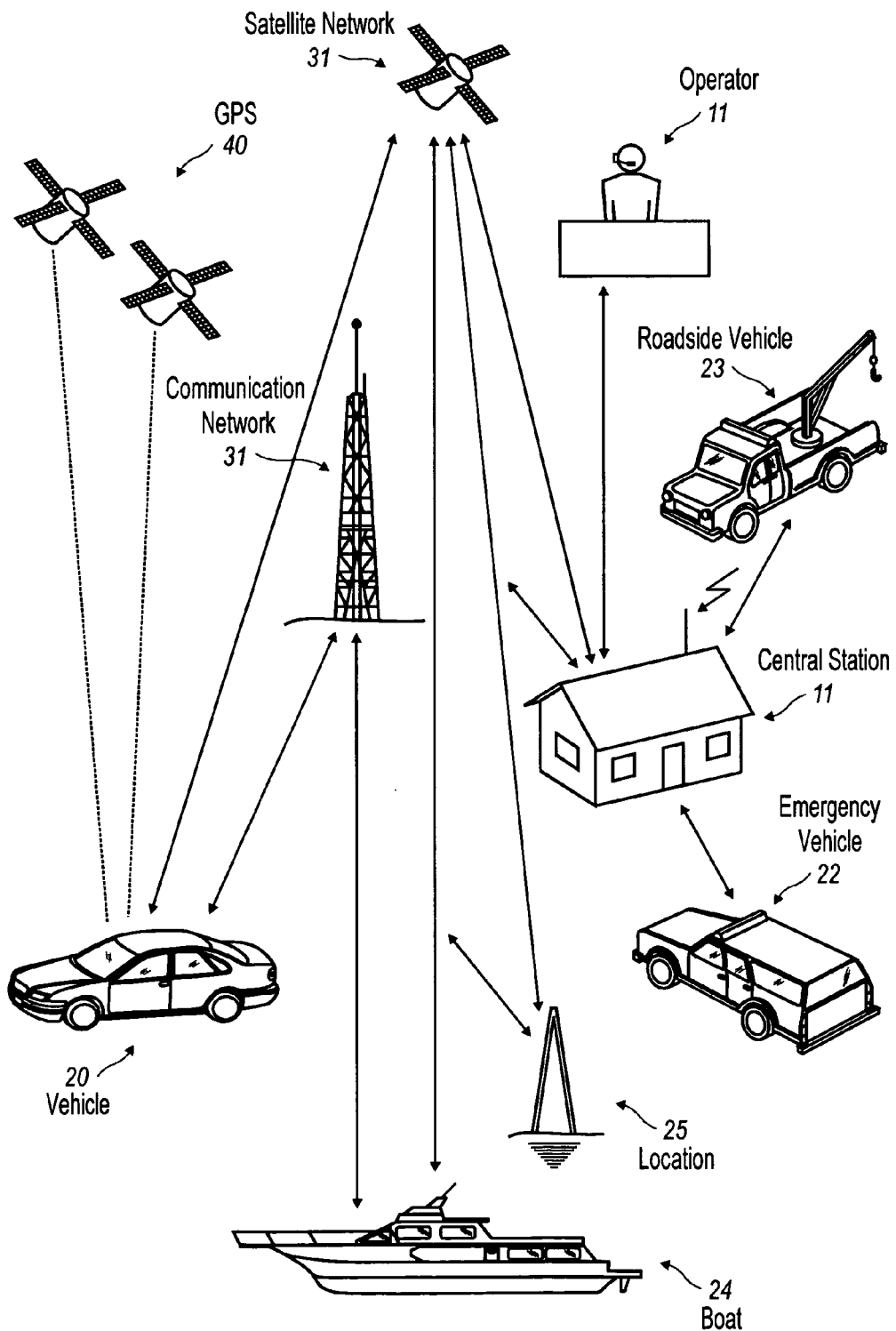
FIG. 1 is a schematic pictorial-type diagram of the environment in which an inventive method is conducted and of the related objects.

A communication system and its environment for application of an inventive method for operating the same is shown in FIG. 1. It comprises (includes, but is not limited to) a central station (customer service center) 10 with an operator 11. At least one vehicle 20, at least one boat or ship 24, as well as one or more stationary equipment pieces or locations 25, like a remote facility, plant or other such objects communicate with the service center 10 via a cellular communication network 30 like GSM (European standard) or AMPS (US standard) and/or a satellite communication network 31, both for exchanging information, data and voice communication, in both directions (transmit and receive). Even software programs can be transmitted if desired.

Emergency assistance vehicles 22 and roadside vehicles 23 communicate with the service center 10 in a similar manner or in any other suitable way, and are activated by the service center in case of need by one of the remote objects 20, 24, 25. A position of each object can be detected by means of a global positioning system (GPS) 40.

Figure 2:
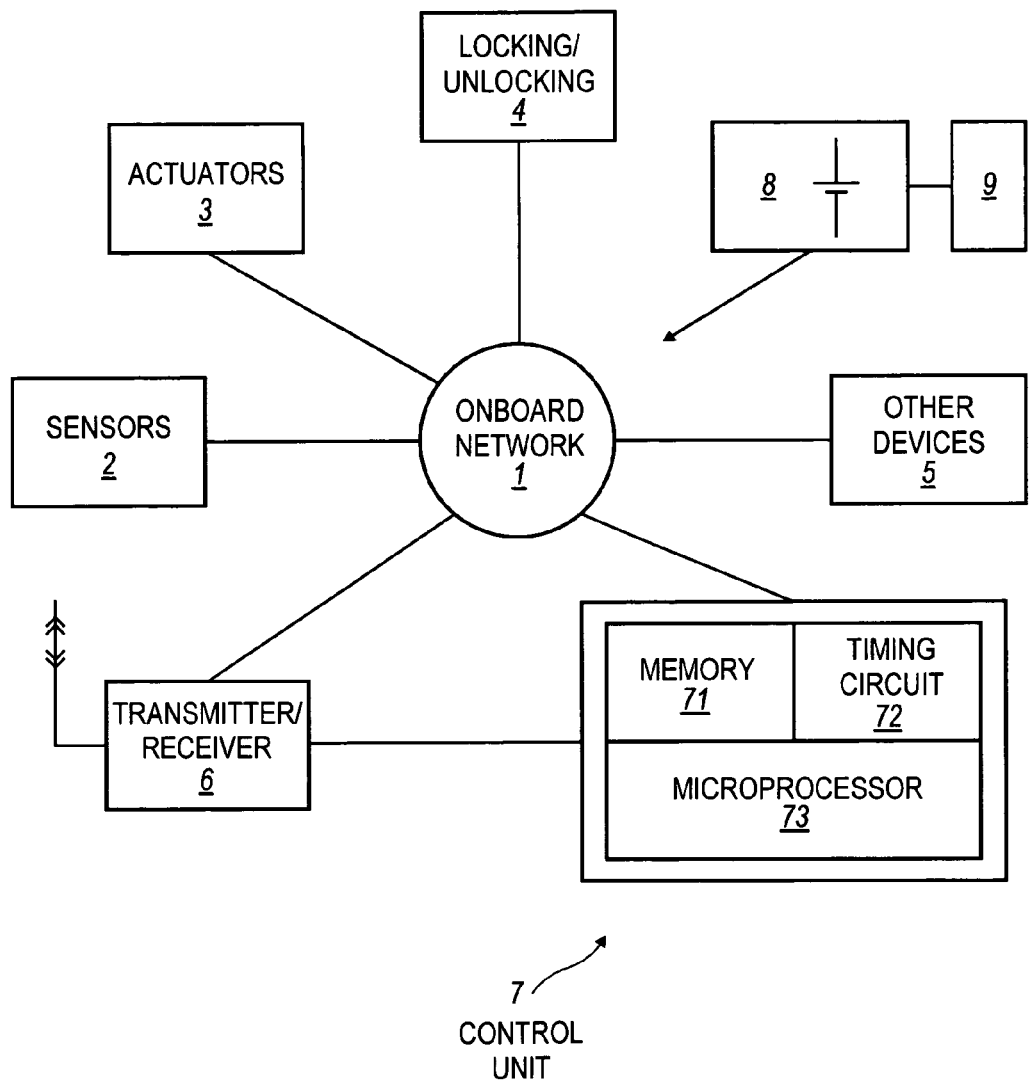
FIG. 2 is a schematic block-type diagram of the major electronic components and associated functions carried out thereupon at an object, including a circuit for implementing the method.

FIG. 2 shows a schematic block diagram of the major electric and electronic components and devices inside an object, which components are a part of the communication system.

An on-board network 1 is provided for controlling, monitoring and interconnecting a plurality of sensors 2, actuators 3, locking/unlocking means or mechanisms 4, and other devices 5 in a known manner. This network 1 has an interface to a transmitter/receiver means 6, which is preferably a mobile communication unit (GSM or AMPS) or a satellite communication unit, so that various operating conditions and functions of the object like motor and oil temperature, can be transmitted to the service center for evaluation and check. As a further example, software programs for operating the object by means of the actuators can be transmitted from the service center to the object and loaded (installed) thereupon.

A reliable communication between the service center and the objects is demanded. The transmitter/receiver means or mechanism 6, as well as the onboard network 1, have to be permanently active even in periods in which the object is not operated. This is necessitated by the fact that if the remote object (vehicle) or facility is in a sleep mode, the service center can not affect communicate therewith. Typically, the required power is supplied by a battery 8 that is charged by a motor-driven generator 9 when the object is operated. However, if the object is not operated, the battery is steadily discharged, and after a time of between, for example, one week and one month, depending on the age and capacity of the battery, the temperature and other conditions, the battery is eventually emptied (run dead). Consequently, the reliability of such a communication system cannot be ensured.

According to the teachings of the present invention, a control unit 7 with a memory 71, a timing circuit 72 and a programmable microprocessor means 73 is provided at each object for operating the communication system and the related objects in a battery saving mode for the purpose of saving battery power.

The basic idea resides in that each object is switched alternately between a wake period for conducting communication between the object and the central station, and a sleep period in which communication is inactive.

During the wake periods the above mentioned communication is conducted and the transmitter/receiver means 6, the on-board network 1 and the on-board electronic components 2-6 are active as required or requested by the service center. During the sleep periods, the transmitter/receiver means 6, the on-board network 1 and the on-board electronic components 2-6 are in a sleep status and only the control unit 7 is active so that as much battery power is saved as possible. If, however, an operator returns to the object, for instance a driver returns to his car and gets in, the battery saving mode is terminated and operation is started as usual.

Preferably, each object is designated a predetermined (and different) first time $t_0$ and a time interval Dt, and each object initiates the wake periods at times $t_0$+n (Dt) with n=0, 1, 2, . . . . The time interval Dt is longer than the estimated longest duration of a wake period.

The duration of the time interval $D_t$, for instance, can be constantly 15 minutes for all objects, or, alternatively, the time interval $D_t$ can be set to a different duration for each object.

The first time $t_0$ and the time interval $D_t$ are preferably stored in the memory 71 and are read out by the microprocessor 73 for enabling the wake periods.

The duration of the wake periods depends on how many actions and communications have to be conducted and transmitted. The control unit 7 is provided for terminating the wake periods and initiating the sleep periods after conduction of such communication requested by the central station as well as any other actions.

The only component that needs to be permanently active is the control unit 7 for time monitoring by means of the timing circuit 72, for initiating the wake periods, and for building up communication with the service center. This is preferably controlled by the microprocessor or (computer) processing means 73.

By such a time-limited wake period, not only battery power at each object, but also network load is saved. For a further improvement in this regard, and to avoid an overload of the service center, the wake periods are distributed among the objects as regular as possible by choosing the first time $t_0$ for each object so that at any one time, there are not too many objects simultaneously active.

This is achieved, for example, by associating the beginning (time $t_0$) of the wake period, relative to a full hour, to a unique identification of the object. This identification can be, for example, a motor number or a vehicle number, or any other individually designated and unique number, from which the beginning (time $t_0$), in terms of minutes or seconds after a full hour, is derived and stored in the memory 71. This causes every object to start with its wake period at a different time.

Alternatively, the memory 71 is provided for storing the unique identification number of the object and for deriving the first time $t_0$ therefrom by means of the control unit 7.

Preferably, the association between each object and the beginning of its wake period is stored in a memory at the service station as well, so that it is known at the service station when an object is active for conducting communication.

If, for example, the designated and predetermined first time $t_0$ for an object is three minutes (and the time interval Dt is fifteen minutes for all objects as mentioned above), this object starts its wake periods at each full hour plus three minutes, and again each 15, 30 and 45 minutes after that time; that is, 0 h 3 min, 0 h 18 min, 0 h 33 min, 0 h 48 min, and so on, beginning with the full hour in which the battery saving mode has been selected. In case of very many objects, the first time $t_0$ can be extended to seconds, such as 4 min 28 seconds.

The inventive method is preferably programmed as a computer program and implemented in the microprocessor means 73 for switching alternately between the wake periods and the sleep periods.

The invention claimed is:

1. A method for operating a communication system for communication between a central station and a plurality of remote objects, the method comprising: operating said objects in a battery saving mode in which an object is switched alternately between a wake period for conducting communication between the object and the central station and a sleep period in which communication is inactive, wherein a predetermined first time ($t_0$) and a predetermined time interval (Dt) is designated to each of the objects for initiating the wake periods at times $t_0+n\,(Dt)$, where n equals increasing integer numbers beginning from zero.

2. The method as recited in claim 1, wherein the first time ($t_0$) and/or the time interval (Dt) is designated by the central station or by each object itself.

3. The method as recited in claim 1, wherein the first time ($t_0$) is a number of minutes and/or seconds counted from the beginning of a full hour.

4. The method as recited in claim 1, wherein the first time ($t_0$) is derived from a unique identification number of the object which is stored at the related object and at the central station in a memory.

5. The method as recited in claim 1, wherein during the sleep period, all electric and/or electronic devices are set inactive and these devices are activated during the wake period.

6. The method as recited in claim 1, wherein a wake period is terminated and a sleep period is initiated by an object after conduction of a communication.

7. The method as recited in claim 1, wherein each object is designated a different first time ($t_0$) and/or a different time interval (Dt).

8. The method as recited in claim 1, wherein each object is designated a different first time ($t_0$) and/or a different time interval (Dt).

9. An arrangement for operating a communication system for communication between a central station and a plurality of remote objects, each object comprising: a control unit for operating power consuming electric and/or electronic devices in a battery saving mode of each remote object in which said a predetermined first time ($t_0$) and a predetermined time interval (Dt) is designated to each of said objects, wherein each of said objects is alternately switched between a wake period for conducting communication between an object and the central station and a sleep period in which communication is inactive, and wherein the wake periods are initiated at times $t_0+n\,(Dt)$, where n equals increasing integer numbers beginning from zero.

10. The arrangement as recited in claim 9, wherein the control unit terminates the wake periods and initiates the sleep periods after conduction of a communication.

11. The arrangement as recited in claim 9, wherein the control unit comprises a memory for storing the first time ($t_0$) and the time interval (Dt), and a timing circuit mechanism adapted for monitoring time and causing the control unit to initiate the wake periods.

12. The arrangement as recited in claim 9, wherein the control unit comprises a memory for storing a unique identification number of the object for deriving the first time ($t_0$) therefrom by means of the control unit.

13. The arrangement as recited in claim 9, wherein the control unit comprises a programmable microprocessor means for operating a communication system for communication between a central station and a plurality of remote objects by operating the objects in a battery saving mode in which an object is switched alternately between a wake period for conducting communication between the object and the central station and a sleep period in which communication is inactive, each of the objects being designated a predetermined first time ($t_0$) and a predetermined time interval (Dt), for initiating the wake periods at times $t_0+n\,(Dt)$, where n equals increasing integer numbers beginning from zero.

14. The arrangement as recited in claim 9, wherein the first time ($t_0$) and/or the time interval (Dt) is designated by the central station or by each object itself.

15. The arrangement as recited in claim 9, wherein each object is designated a different first time ($t_0$) and/or a different time interval (Dt).

16. A method for operating a communication system for communication between a central station and a plurality of remote objects, the method comprising: operating a system of a plurality of objects, said objects including at least one remotely traveling vehicle that carries electricity consuming devices on-board, in a battery saving mode in which each of the plurality of object is switched alternately between (1) a wake period during which communications are conducted between the object and a central station and (2) a sleep mode in which communication is inactive; and wherein a predetermined first time ($t_0$) and a predetermined time interval (Dt) is designated to each of the objects for initiating the wake periods at regular intervals at times $t_0+n\,(Dt)$, where n equals increasing integer numbers beginning from zero.

17. The method as recited in claim 16, wherein a first wake period is initiated by a communication requested by a central station and subsequent wake periods during which communications are affected between the object and central station are initiated by the object at the predetermined time interval (Dt).

18. The method as in claim 16, wherein the first time ($t_0$) is a number of minutes and/or seconds counted from the beginning of a full hour.

19. The method as recited in claim 16, wherein the first time ($t_0$) is derived from a unique identification number of the object which is stored at the related object and at the central station in a memory.

20. The method as recited in claim 16, wherein the first time ($t_0$) and/or the timer interval (Dt) is designated by the central station or by each object itself.

21. A computer readable medium storing a computer program, comprising: computer program code means run on a programmable microprocessor means for operating a communication system for communication between a central station and a plurality of remote objects by operating the objects in a battery saving mode in which an object is switched alternately between a wake period for conducting communication between the object and the central station and a sleep period in which communication is inactive, a predetermined first time ($t_0$) and a predetermined time interval (Dt) is designated to each of the objects for initiating the wake periods at times $t_0+n\,(Dt)$, where n equals increasing integer numbers beginning from zero when loaded into internal memory of the programmable microprocessor means.

* * * * *